Dec. 19, 1950 J. E. SMITH ET AL 2,534,535

SECRECY SYSTEM

Filed Dec. 7, 1942 2 Sheets-Sheet 1

INVENTOR
RICHARD E. MATHES.
and J. ERNEST SMITH
BY H. S. Grover
ATTORNEY

INVENTOR
RICHARD E. MATHES
and J. ERNEST SMITH.
BY H. S. Grover
ATTORNEY

Patented Dec. 19, 1950

2,534,535

UNITED STATES PATENT OFFICE 2,534,535

SECRECY SYSTEM

J Ernest Smith, Jackson Heights, N. Y., and Richard E. Mathes, Silver Spring, Md., assignors to Radio Corporation of America, a corporation of Delaware Application December 7, 1942, Serial No. 468,084

20 Claims. (Cl. 250—6)

This invention relates to a radio communication system provided with means for assuring secrecy or privacy of transmitted messages.

An object of the invention is to disguise radio messages which are modulated with useful speech so as to render the reception of the messages unintelligible to unauthorized listeners.

Another object is to secure secrecy in the transmission of speech by employing a pulse type communication system.

Generally stated, the secrecy or privacy radio communication system of the invention employs a transmitter which produces variable frequency and variable length (variable weight) pulses, wherein the length of pulse varies in accordance with the signal modulation and the instantaneous center frequency or repetition rate varies in accordance with a predetermined code. Impulses are transmitted corresponding to only one edge of the variable length pulse, and this edge may be either the trailing or the leading edge. At the receiver, there is provided a local reference impulse oscillator which aids in regenerating the pulses so that they have a duration length or weight determined by the instantaneous phase difference between the incoming received impulses and the locally generated reference impulses. The frequency of this local oscillator at the receiver corresponds to the instantaneous frequency or repetition rate of the variable length impulses at the transmitter and varies correspondingly in accordance with said aforementioned predetermined code.

A more detailed description of the invention follows in conjunction with the drawing, wherein.

Figure 1:
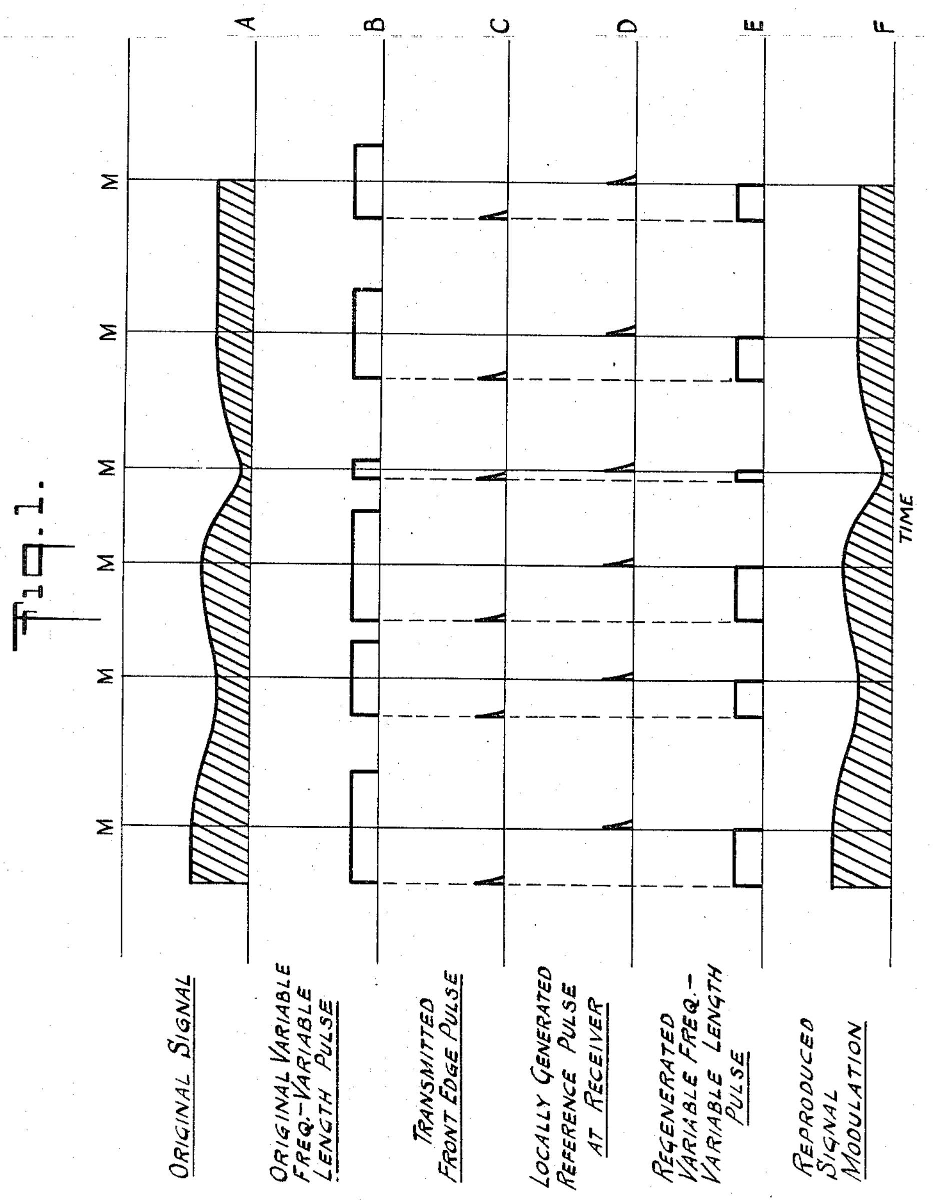
Fig. 1 illustrates graphically the operation of the system in pulse form.

In Fig. 1, the shading of line A represents the useful modulation to be transmitted. This useful modulation constitutes graphically a small part of the speech wave form which might be employed as useful modulation. The rectangular pulses of constant amplitude shown in line B represent variable length or weight pulses of varying frequency or repetition rate which are produced at the transmitter. These pulses have their center points M spaced at unequal time intervals depending upon the instantaneous frequency rate of the pulses, which frequency rate varies in accordance with a predetermined code, as described later. The weight or length of the constant amplitude pulses varies in accordance with the speech modulation wave form of line A. Line C graphically shows a series of sharp impulses which appear at time intervals corresponding to the leading edges of the variable length pulses of line B. The remainder of the variable length pulses including the trailing edge impulses have been suppressed. The impulses of line C correspond in time and point of occurrence with the impulses received by the receiver. Line D represents impulses which are generated locally at the receiver at time intervals corresponding to the center points M of the variable length reference pulses produced at the transmitter. The pulses illustrated in line E represent the regenerated pulses at the receiver having a length or weight corresponding to the time interval or phase difference between the incoming received impulses C and the locally generated reference impulses of line D. Line F illustrates signal speech modulation at the receiver reproduced from the regenerated pulses of line E.

Figure 2:
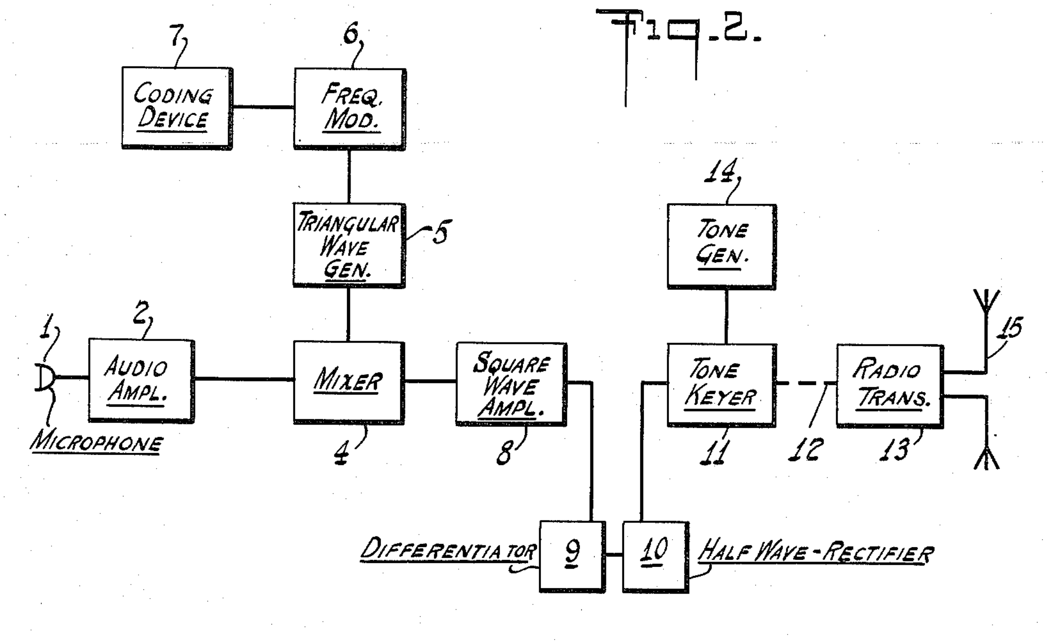
Fig. 2 illustrates a preferred form of transmitter for use in connection with the present invention.

Fig. 2 shows one form of transmitter for the present invention. This transmitter comprises a signal source or microphone 1 for producing speech waves whose output circuit is connected to the input of an audio amplifier 2. The amplifier output circuit is connected to the grid or input electrode of a mixer tube 4. The mixer tube 4 has a portion of its grid bias under control of the output from amplifier 2. The fixed portion of the mixing tube grid bias may be so adjusted that the tube is at cutoff when the amplifier alternating current voltage output is at a minimum. Triangular wave form voltage (for example, saw-tooth waves) from the triangular generator 5 is supplied in series with the grid of the mixing tube 4. The triangular wave form voltage and the amplifier output voltage thus combine in the mixing tube to produce varying amplitude anode current pulses of triangular form, which are supplied to the square wave amplifier 8. The frequency of the generator 5 is varied by a frequency modulator 6 which can be a reactance tube or a mechanical capacity arrangement which varies pursuant to a special code determined by the coding device 7. In this way, the frequency of the saw-tooth generator 5 continuously varies at a desired rate and between predetermined limits under the control of the frequency modulator. The square wave amplifier 8 converts the triangular wave form pulses of varying amplitude delivered by the mixer to constant amplitude-variable weight pulses or dots whose weight or length varies in accordance with the signal modulation and whose instantaneous frequency or recurring rate is governed by the rate of variation of the saw-tooth frequency. These variable frequency-variable length pulses of constant amplitude appear in the output of the square wave amplifier 8 and are impressed upon a differentiator circuit 9, which converts each variable length pulse into discrete positive and negative impulses, one of which appears at the beginning or leading edge and the other of which appears at the end or trailing edge of the variable length pulses. The output of the differentiator is impressed upon a half wave rectifier 10 which suppresses one of these discrete impulses, the other of which is passed on as keying bias for tone keyer stage 11. The tone keyer stage 11 is supplied with carrier current from a tone generator 14. The output of keyer stage 11 supplies keyed carrier current to the line 12 extending to the radio transmitter 13. This keyed carrier current is radiated from the radio transmitter 13 over antenna 15 toward the remote receiver.

The signal modulation shown in line A of Fig. 1 corresponds to the wave form which appears in the output of amplifier 2. The variable frequency-variable length pulses of constant amplitude which appear in the output of the square wave amplifier 8 correspond to the pulses shown in line B of Fig. 1. The discrete impulses appearing in the output of half wave rectifier 10 and which correspond to the beginning or leading edges of the variable weight variable frequency pulses are illustrated in the line C of Fig. 1.

In a practical construction of the transmitter of Fig. 2, the audio amplifier 2 may be a single stage amplifier and the mixing tube 4 may be in the form of a triode which has a portion of its grid bias under the control of the amplifier output. The triangular wave form voltage would normally reach the mixing tube 4 through a vacuum tube, a transformer and a potentiometer. This potentiometer serves to adjust the triangular wave generator frequency level. The output of the full wave amplifier 2 would normally be supplied to the mixer tube over a route including a low pass filter across whose output is a potentiometer having a tap connected to the mixing tube grid. The square wave amplifier 8 may comprise any suitable circuit and, in one form, may be composed of a pair of vacuum tubes having associated resistors and condensers so connected as to consist essentially of a resistance coupled amplifier trigger circuit, the trigger regeneration being furnished by a condenser between the anode of one of the vacuum tubes and the grid of the other vacuum tube of the trigger circuit, and the duration of maximum amplitude being determined by the amplitude of the triangular wave pulses in the mixing tube anode circuit. The tone keying stage 11 may consist of a push-pull arrangement of a double triode vacuum tube whose keying bias is obtained from the half wave rectifier. The differentiator circuit 9 may comprise a capacity having a small reactance at the fundamental pulse frequency and a resistance of relatively large value. Such an arrangement is well known in the art. The half wave rectifier 10 should be so biased as to be conductive for, let us say, positive impulses only which are passed by the differentiator, whereby the output of the half wave rectifier will have direct current impulses of such polarity as to suitably bias the tone keyer stage 11 to pass the carrier tone. The structural form of the various stages just described will be apparent to any one skilled in the art, particularly those familiar with constant frequency-variable dot systems employed for facsimile communication, sometimes referred to as C. F. V. D. systems.

Figure 3:
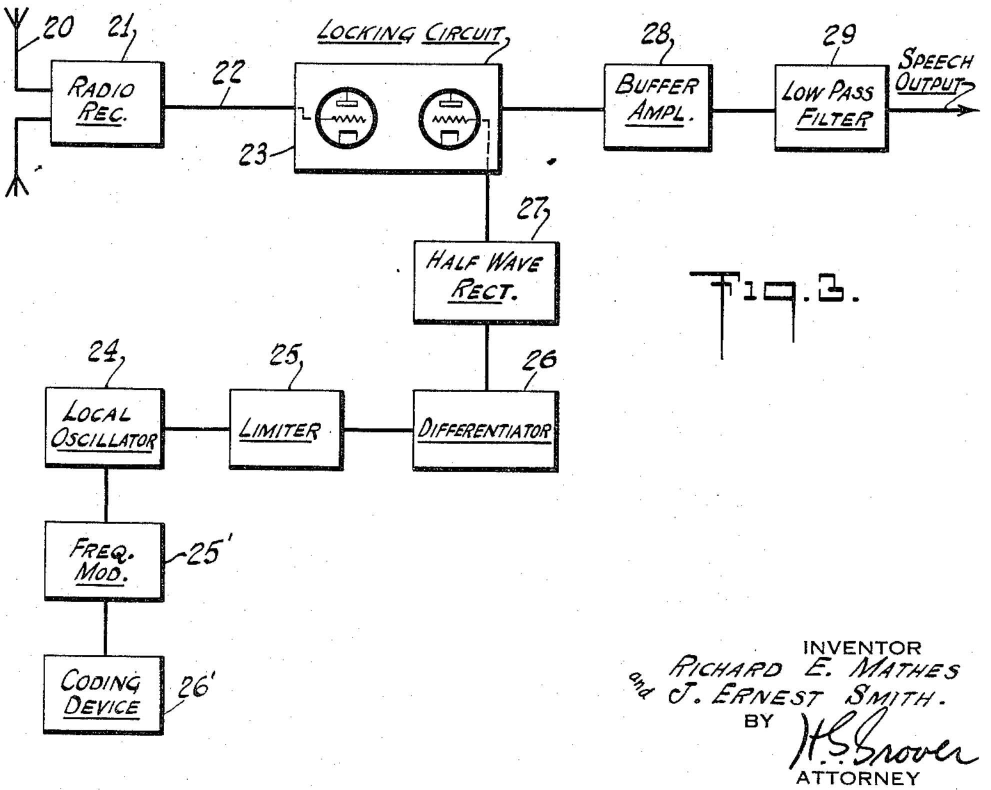
Fig. 3 illustrates a preferred form of receiving system for receiving and translating the messages sent out by the transmitter of Fig. 2.

Fig. 3 shows one form of receiving system which may be employed to receive the pulses transmitted by the transmitter of Fig. 2. In Fig. 3, the impulses collected by antenna 20 are passed on to the radio receiver 21 whose output is in the form of direct current impulses appearing in line 22. These direct current impulses in line 22 are impressed upon a suitable locking or trigger circuit 23 consisting of a pair of vacuum tubes whose anodes and grids are resistively interconnected in such manner that the apparatus has two degrees of electrical stability. The tubes of the locking circuit are unstable when both are drawing current but stable when one tube is passing current and the other tube blocked, or prevented from passing current. The change from one condition of stable equilibrium, such as when one tube is non-conductive and the other tube conductive, to the other condition wherein the current passing conditions of the tubes are reversed, is caused by the presence of a suitable predetermined potential on the grid of one of the tubes or the other. That is to say, there exists a predetermined maximum anode current flow in one of the tubes of the locking circuit and a predetermined minimum anode current flow in the other tube of the locking circuit, or the reverse, at the same time. For a more amplified description of the locking circuit, reference is made to Finch United States Patent 1,844,950.

The receiver is provided with a local oscillator 24 whose output serves to supply reference impulses to the locking circuit 23 through a limiter 25, a differentiator circuit 26, and a half wave rectifier 27. This local oscillator 24 can be a sine wave tone generator. The limiter 25 produces a flat top wave form which is impressed on a differentiator 26, the latter in turn converting this flat top wave form into discrete positive and negative impulses, one of which is suppressed by the half wave rectifier 27. The frequency of the local oscillator 24 is the same as that of the saw-tooth oscillator 5 at the transmitter, and this frequency is controlled by a frequency modulator 25' and coding device 26'. The coding device 26' is, of course, identical with that used at the transmitter and labeled 7 in Fig. 2. In practice, both the local oscillator 24 of the receiver and the saw-tooth generator 5 at the transmitter are highly stable for any fixed direct current signal on the associated reactance tube frequency modulator.

The lead 22 from the radio receiver 21 is connected to the grid of one tube of the locking circuit 23 while the output of the half wave rectifier 27 is connected to the grid of the other tube of the locking circuit. Thus, at the receiver the impulses collected on antenna 20 of time phase as shown in line C of Fig. 1, are compared against locally generated impulses impressed on the locking circuit through the half wave rectifier 27 and having a time phase as illustrated in line D of Fig. 1. The impulses from the radio receiver 21 will trigger the locking circuit 23 to initiate the passage of current in the output of the locking circuit, while the impulses impressed on the locking circuit by the half wave rectifier 27 will determine the duration of the current pulses passed by the locking circuit and will change the condition of equilibrium of the locking circuit. Thus the locking circuit serves to regenerate or restore at the receiver the original variable length pulses of the transmitter, but this regenerated pulse at the receiver will have a duration equal to only one-half of the weight or pulse length of the variable length pulses of the transmitter. These regenerated variable length pulses are illustrated in line E of Fig. 1, and, it should be noted, they have an instantaneous frequency identical with the instantaneous frequency of the pulses of line B.

The output from the locking circuit 23 is passed through a buffer amplifier 28 and then through a low pass filter 29 from which there is obtained the original speech modulation shown in line F of Fig. 1.

It is essential that the local frequency of the oscillator 24 of the receiver and the phase of the locally generated reference pulses impressed on the locking circuit 23 be accurately referred to the signals at the transmitting end of the system. For this purpose, the instantaneous frequency of the local oscillator 24 must at all times be the same as the instantaneous frequency of the triangular wave generator 5. The privacy or secrecy in the transmission and the reception of the messages is assured by virtue of the change of the basic recurrence frequency of the signal impulses at the transmitter and, correspondingly, the frequency of the locally generated impulses at the receiver. This change in the instantaneous frequency of the signal impulses is made simultaneously at both the transmitter and the receiver and may be random in nature. Unless an authorized listener can follow these changes of frequency, it would be impossible for him to obtain any intelligibility from the pulse signals.

What is claimed is:

1. In a pulse modulation communication system, the method of operation which includes producing variable weight and variable repetition rate pulses whose variations in weight are in accordance with variations in the signal modulation.

2. In a pulse modulation communication system, the method of operation which includes producing constant amplitude and variable weight pulses whose instantaneous repetition rate varies continually.

3. In a pulse modulation communication system, the method of operation which includes producing constant amplitude pulses whose weight or duration varies in accordance with the signal modulation and whose repetition rate changes continuously in accordance with a predetermined pattern or code.

4. In a pulse modulation communication system, the method of operation which includes producing constant amplitude and variable weight pulses whose instantaneous repetition rate varies continually, deriving an impulse from one edge of each of said pulses, and keying an alternating current wave by said derived impulses.

5. In a pulse modulation communication system, the method of operation which includes producing constant amplitude and variable weight pulses whose instantaneous repetition rate varies continually, deriving sharp impulses from the leading and trailing edges of said variable weight pulses, suppressing the impulses obtained from one of said edges, and keying an alternating current wave with the desired unsuppressed impulses.

6. In a pulse modulation communication system, the method of operation which includes producing constant amplitude and variable weight pulses whose instantaneous repetition rate varies continually, deriving a sharp impulse from one edge of each of said variable weight pulses, suppressing the remaining portion of said pulses, keying a tone by said derived impulses, and controlling the radiation of a radio frequency carrier wave in accordance with said keyed tone.

7. In a pulse modulation communication system, the method of operation which includes producing constant amplitude and variable weight pulses whose instantaneous repetition rate varies continually, deriving a sharp impulse from one edge of each of said variable weight pulses, suppressing the remaining portion of said pulses, keying a tone by said derived impulses, and radiating carrier wave impulses which are spaced apart in accordance with the spacing of the keyed tone, receiving said carrier wave impulses, and utilizing said received impulses to regenerate constant amplitude and variable weight pulses whose relative weights are proportioned to the weights of the originally produced pulses and whose instantaneous repetition rate is the same as and varies substantially identically with the variation in rate of the originally produced pulses.

8. In a pulse modulation communication system, the method of operation which includes producing constant amplitude and variable weight pulses whose instantaneous repetition rate varies continually, deriving a sharp impulse from one edge of each of said variable weight pulses, suppressing the remaining portion of said pulses, keying a tone by said derived impulses, radiating carrier wave impulses which are spaced apart in accordance with the spacing of the keyed tone, receiving said carrier wave impulses, rectifying them, producing local oscillations whose frequency is the same as the repetition rate of said variable weight pulses and which varies continuously in the same manner as the continually varying repetition rate of said variable weight pulses, limiting the amplitudes of said local oscillations, producing a sharp impulse from one edge of each of said limited oscillations, and regenerating variable weight pulses whose durations are determined by the instantaneous phase difference between the received carrier wave impulses and the locally produced impulses.

9. In a pulse modulation communication system, the method of operation which includes producing constant amplitude pulses whose weight or duration varies in accordance with the signal modulation and whose repetition rate changes continuously in accordance with a predetermined pattern or code, producing a sharp impulse from one edge of each of said variable weight pulses, keying a tone by said sharp impulses, radiating carrier wave impulses which are spaced apart in accordance with the spacing of the keyed tone, receiving said carrier wave impulses, rectifying them, producing local oscillations whose frequency is the same as the repetition rate of said variable weight pulses and which varies continuously in the same manner as the continually varying repetition rate of said variable weight pulses, limiting the amplitude of said local oscillations, producing a sharp impulse from one edge of each of said limited oscillations, regenerating variable weight pulses whose durations are determined by the instantaneous phase difference between the received carrier wave impulses and the locally produced impulses, and deriving the original signal modulations from said regenerated variable weight pulses.

10. In a pulse communication system, the method of operating a receiver adapted to receive carrier wave impulses whose rate of occurrence varies and is the same as the repetition rate of variable weight pulses suppressed at the transmitter, which comprises receiving said carrier wave impulses, producing local oscillations whose frequency is the same as and which varies in the same manner as the repetition rate of said suppressed variable weight pulses, limiting the amplitude of the wave form of said local oscillations, producing a sharp impulse from one edge of each limited wave form of said oscillations, and regenerating variable weight pulses whose durations are determined by the instantaneous phase difference between the received carrier wave impulses and the locally produced impulses.

11. The method of transmitting a radio wave which includes modulating recurring triangular waves by current representing speech modulations, varying the frequency of the triangular waves in accordance with a predetermined pattern, generating rectangular wave pulses of constant amplitude but of variable weight from said modulated triangular waves, the variation in weight of said pulses representing the intensity of the speech modulation, differentiating said variable weight pulses to produce discrete impulses from the leading and trailing edges of the pulses, utilizing the impulses obtained from only one of said edges to start the flow of a local source of current, and applying such local currents to key a transmitter.

12. In a pulse modulation communication system, means for producing constant amplitude and variable frequency pulses whose weight varies and is controlled by the degree of signal modulation, means for converting said variable weight pulses into impulses of substantially the same amplitude, said impulses being variably spaced, and means actuated by said discrete impulses for keying a transmitter.

13. In a pulse communication system, a source of speech modulating waves, an amplifier for said waves, a local generator, means for continually varying the frequency of the oscillations produced by said generator, a mixer tube coupled to the outputs of said amplifier and generator for combining voltages derived therefrom, a rectangular wave amplifier coupled to the output of said mixer tube to thereby produce pulses of constant amplitude and varying frequency and of variable weight which depends upon the degree of speech modulation, a circuit for converting each of said pulses into a discrete impulse of a desired polarity, and a keyer stage actuated by said impulse for keying a transmitter.

14. In a pulse communication system, a source of speech modulating waves, an audio amplifier for said waves, a saw-tooth wave form generator, means for continually varying the frequency of said saw-tooth generator, a mixer tube, connections from the outputs of said amplifier and said generator to the input of said mixer tube, a square wave amplifier coupled to the output of said mixer tube to thereby produce pulses of constant amplitude and varying frequency and variable weight, a differentiator coupled to the output of said square wave generator to convert said pulses into discrete impulses of different polarities occurring at times corresponding to the leading and trailing edges of said pulses, a half-wave rectifier coupled to said differentiator for suppressing one of the discrete impulses produced from each pulse, and a tone keyer actuated by the other discrete impulse which is passed by said half-wave rectifier.

15. In a pulse communication system, a source of speech modulating waves, an amplifier for said waves, a local generator, means for continually varying the frequency of the oscillations produced by said generator, a mixer tube coupled to the outputs of said amplifier and generator for combining voltages derived therefrom, a rectangular wave amplifier coupled to the output of said mixer tube to thereby produce pulses of constant amplitude and varying frequency and of a variable weight which depends upon the degree of speech modulation, a circuit for converting each of said pulses into a discrete impulse of a desired polarity, a keyer stage actuated by said impulse for keying a transmitter to radiate carrier wave impulses, a receiver for receiving the carrier wave impulses, a rectifier in said receiver, a locking circuit having a pair of tubes whose cold electrodes are resistively interconnected to produce two degrees of electrical stability, a local oscillator at said receiver whose frequency is the same as and varies in the same manner as the frequency of the local generator at the transmitter, a limiter coupled to the output of said local oscillator, a circuit for converting the output of said limiter into discrete impulses of a desired polarity, a connection from said circuit to one of the tubes of said locking circuit, a connection from the rectifier of said receiver to the other tube of said locking circuit, whereby said locking circuit regenerates pulses of constant amplitude and of the same frequency as said local oscillator but of varying weight whose duration is determined by the instantaneous phase difference between the received carrier wave impulses and the locally produced discrete impulses, and means coupled to the output of said locking circuit for reproducing the original signal modulation from said regenerated pulses.

16. In a pulse modulation communication system, the method of operation which includes producing constant amplitude and variable weight pulses whose weight varies in accordance with modulation and whose instantaneous repetition rate varies continually for all conditions of modulation, deriving a sharp impulse from one edge of each of said variable weight pulses, suppressing the remaining portion of said pulses, and controlling the radiation of a radio frequency wave in accordance with said derived impulses.

17. The method of transmitting a radio wave which includes modulating recurring triangular waves by current representing speech modulations, varying the frequency of the triangular waves in accordance with a predetermined pattern, generating rectangular wave pulses of constant amplitude but of variable weight from said modulated triangular waves, the variation in weight of said pulses representing the intensity of the speech modulation, differentiating said variable weight pulses to produce discrete impulses from the leading and trailing edges of the pulses, and utilizing the impulses obtained from only one of said edges to key a radio transmitter.

18. In a pulse modulation communication system, the method of operation which includes producing constant amplitude and variable weight pulses whose instantaneous repetition rate varies continually, deriving an impulse from one edge of each of said pulses, and keying an unmodulated alternating current wave by said derived impulses.

19. In combination, a source of carrier wave of high frequency oscillations, means for producing a succession of pulses, means for frequency modulating said pulses in accordance with a first signal, means for width modulating said frequency modulated pulses in accordance with a second signal, and means for transmitting said plural modulated pulses on said carrier wave.

20. In a communication system, the method of operation which includes producing pulses that vary both in weight and repetition rate, at least one of said variations being in accordance with variations in a signal.

J ERNEST SMITH.
RICHARD E. MATHES.

REFERENCES CITED

The following references are of record in the file of this patent:

UNITED STATES PATENTS

| Number | Name | Date |
|---|---|---|
| 2,061,734 | Kell | Nov. 24, 1936 |
| 2,113,214 | Luck | Apr. 5, 1938 |
| 2,227,108 | Roosenstein | Dec. 31, 1940 |
| 2,266,401 | Reeves | Dec. 16, 1941 |
| 2,272,070 | Reeves | Feb. 3, 1942 |
| 2,298,562 | Henroteau | Oct. 13, 1942 |

FOREIGN PATENTS

| Number | Country | Date |
|---|---|---|
| 541,665 | Great Britain | Dec. 5, 1941 |